United States Patent [19]
Wiewiorowski et al.

[11] Patent Number: 5,289,594
[45] Date of Patent: Mar. 1, 1994

[54] WATER SAVER TOILET FLUSH CONTROL SYSTEM

[76] Inventors: Tadeusz K. Wiewiorowski, 2620 Danbury Dr., New Orleans, La. 70131; Dwight S. Nunley, 500 Oakwood Dr., Gretna, La. 70056

[21] Appl. No.: 69,204

[22] Filed: May 27, 1993

[51] Int. Cl.⁵ .......................... E03D 1/24; E03D 1/35
[52] U.S. Cl. ............................. 4/415; 4/325; 4/379
[58] Field of Search ............ 4/324, 325, 379, 381, 4/385, 391, 394, 395, 412, 415; 29/401.1, DIG. 85

[56] References Cited

U.S. PATENT DOCUMENTS

4,080,669  3/1978  Biggerstaff ........................ 4/325

*Primary Examiner*—Henry J. Recla
*Assistant Examiner*—Gregory M. Vidovich

[57] ABSTRACT

A toilet flush control system which provides control over the volume of water used in conventional tank-type toilets. The disclosed toilet flush control apparatus and method can be used in existing toilets by easily retrofitting such toilets with said apparatus. The toilet flush control apparatus may also be incorporated into the design of new toilets. The apparatus comprises a flapper-type flush valve which by itself does not have adequate buoyancy to remain open during the flush cycle of a toilet and which is equipped with an eyelet member; a buoyant member capable of imparting the needed buoyancy to the valve during the flush cycle; a flexible line connected at one end to the buoyant member and passing through said eyelet, and mechanism for adjusting the vertical distance between the flush valve and the buoyant member from outside the toilet tank. The volume of water saved during flushing is equivalent to the volume of water between the level of the flush valve and the level of the buoyant member.

11 Claims, 2 Drawing Sheets

WATER SAVER TOILET FLUSH CONTROL SYSTEM

FIELD OF THE INVENTION

This invention relates to a toilet flush control system which provides variable control, from outside the toilet tank, over the volume of water used in conventional tank-type toilets. The toilet flush control apparatus and method of this invention can be used in existing toilets by inexpensively retrofitting such toilets with said apparatus. The toilet flush control apparatus may also be incorporated into the design of new toilets.

BACKGROUND OF THE INVENTION

Conventional tank-type toilet used in households throughout North America were developed many years ago. The apparatus most commonly used to control the flushing cycle of these tanks consists of a flush valve connected to a lift arm. The flush valve has a built-in float, or positive buoyancy means, usually in the form of a styrofoam component or an air pocket, and is designed to have adequate buoyancy to remain open upon raising and releasing the lift arm until substantially all of the water contained in the flush tank is drained into the toilet bowl. As the water level in the toilet tank nears the bottom of the tank where the flush valve is located, the absence of adequate water in the tank causes the flush valve to lose its buoyancy. This enables the valve to reseal the toilet tank discharge opening, thus allowing the tank to refill via a separate refill mechanism. This relatively simple toilet tank design has proven commercially successful and reliable over the years, but suffers from a very serious drawback, i.e. regardless of need, a large volume of water (about 4 to 5 gallons) is used with each flush. This volume of water is particularly excessive when flushing liquid waste alone, or liquid waste accompanied by a small quantity of toilet tissue.

It is generally recognized that toilets account for a very significant component of water usage, particularly in metropolitan areas. According to the U.S. Department of Housing and Urban Development, toilets account for at least 40% of the water used in households. In recent years, because of increases in population density and the associated rise in demand for water, and because of limitations with regard to water supplies, severe water shortages have developed in some parts of the country and are anticipated in many others. Municipalities are struggling to keep up not only with the rising demand for water, but also with the corresponding need for costly additional water and sewerage treatment facilities.

There have been numerous devices proposed to reduce the amount of water used for flushing toilets. For example, U.S. Pat. No. 3,812,545 discloses a toilet tank flush valve with manually adjustable buoyancy. Since the lid of the toilet tank has to be removed in order to make the adjustment, there are serious operational drawbacks associated with the use of this valve.

U.S. Pat. No. 4,969,218 discloses a semi-flush kit employing two floats. Its design is very complex and appears to be of doubtful reliability and practicality.

U.S. Pat. Nos. 5,023,960 and 5,073,995 disclose water saver devices which cause the flapper valve in a conventional toilet tank to close prematurely. The designs of these devices are also quite complex and offer limited flexibility over the control of the volume of water used per flush.

U.S. Pat. No. 5,031,254 discloses a device that prevents automatic operation of a toilet tank and requires the user to keep the lift arm in an open position for the duration of the flush cycle. The device appears to be of limited practicality.

U.S. Pat. No. 5,042,096 provides a dual-level toilet flushing mechanism featuring an upper and a lower flapper valve activated by upward and downward, respectively, swivel action of the flush handle. The amount of water used per flush can be selected from only two predetermined volumes.

U.S. Pat. No. 5,070,547 provides a semi-flush retrofit kit that includes double flush handles, such that if one handle is pressed downward the toilet is flushed fully and if the other handle is pressed downward the toilet tank is only partially emptied. The kit appears very complex, and offers only two predetermined flush options—full and partial.

U.S. Pat. No. 5,070,548 discloses a toilet tank attachment for reducing the amount of water with which the toilet bowl is filled. With the attachment in place, the amount of water used per flush can not be varied.

U.S. Pat. No. 5,153,948 discloses a water saver unit which includes a flapper valve and a float positioned on the strap linking the flapper valve with the lift arm of the toilet tank. The unit is quite simple, but suffers from a very serious operational drawback. In order to change the amount of water used per flush, one has to lift the lid of the toilet tank and manually adjust the position of the float.

U.S. Pat. No. 5,157,796 discloses a double flush toilet apparatus which facilitates full or partial flushing of water from a toilet tank, but lacks convenient flexibility for adjusting the volume of water used during a partial flush.

Many of these patents served to further the understanding of problems associated with efforts to reduce water usage in conventional toilets. None, however, has suggested an apparatus that can be adjusted from outside of the tank to provide an infinite number of settings and yet be sufficiently simple, retrofitable, flexible, reliable and inexpensive to gain wide commercial acceptance.

In light of the foregoing, there still exists a need in the art for new methods of water conservation. There also exits a need for new technologies which will reduce per capita water consumption without water rationing or other unwarranted hardships.

It is, accordingly, an object of the present invention to provide an apparatus for controlling and reducing the volume of water used in flushing conventional toilets.

It is another object of the invention to provide an apparatus enabling one to control from outside the toilet tank the amount of water to be used when flushing the toilet.

It is a further object of this invention to provide a method for converting a conventional toilet tank which releases a large volume of water with each flush to a water saving toilet tank using the apparatus of this invention.

It is still another object of this invention to facilitate new toilet tank designs utilizing the water saving apparatus of this invention.

These and other objects of the invention will be apparent to those skilled in the art from the specification and attached drawings taken in their entirety.

SUMMARY OF THE INVENTION

In accordance with the present invention there is provided an apparatus for variably adjusting the volume of discharge water from a toilet of the type having a tank with a flush port therein, a valve seat surrounding said port, a flapper-type flush valve seated on said valve seat for opening and closing said flush port, a lift arm for activating said flush valve, and a flush line connecting said lift arm to said flush valve, the apparatus comprised of:

(a) a non-buoyant flush valve having an eyelet member for the free passage of a flexible line;

(b) a buoyancy means for providing adequate buoyancy to the flush valve so that it remains open during discharge of a predetermined volume of water from the tank, but not so much buoyancy that it will counteract the hydrostatic pressure upon the flush valve in its closed position;

(c) a flexible line which freely passes through said eyelet member and is secured at one end to said buoyancy means, and at its other end is secured to a means for adjusting the distance between the flush valve and said buoyancy means; and (d) a means for adjusting the distance between the flush valve and said buoyancy means, wherein said adjusting means is located on an outside surface of said tank.

In a preferred embodiment of the present invention the eyelet member is a fairlead.

In another preferred embodiment of the present invention the eyelet member is attached to top of that part of said flush valve which is positioned over the discharge opening of the toilet tank when said flush valve is in its closed position.

In yet another preferred embodiment of the present invention, the flexible line securing the buoyancy means to the means for adjusting the distance between the buoyancy means and the flush valve is composed of a monofilament polymeric material.

In still another preferred embodiment of the present invention, the means for adjusting the distance between the buoyancy means and the flush valve comprises a magnet positioned on an iron metal strip attached to an outside wall of said toilet tank and wherein the other end of said flexible line is attached to said magnet.

DETAILED DESCRIPTION OF THE INVENTION

Figure 1:
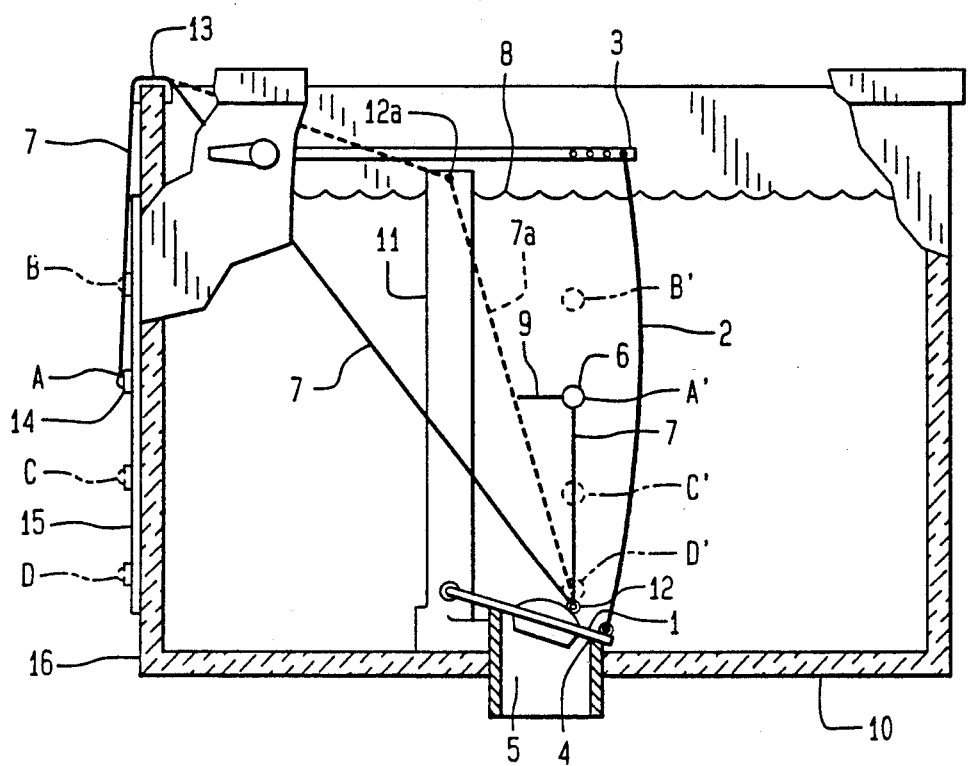
FIG. 1 is a front view, partly in elevation and partly in section, of a toilet tank equipped with an apparatus representing a preferred embodiment of this invention.

The present invention relates to an apparatus and a method for controlling the volume of water used in conventional tank-type toilets. The toilet flush control apparatus and method of this invention can be used in existing toilets by retrofitting such toilets with said apparatus. The toilet flush control apparatus may also be incorporated into the design of new toilets. The apparatus of this invention comprises a flapper-type flush valve having an eyelet member; a buoyancy means; a means for adjusting the vertical distance between the flush valve and the buoyancy means; and a flexible line, which freely passes through the eyelet member with one end attached to the buoyancy means and the other attached to the means for adjusting the vertical distance between the flush valve and the buoyancy means. The flapper type flush valve is connected to the lift arm of the toilet tank in the usual manner by means of a flush line. Any material which is conventionally used for such means may be used in the practice of the present invention. Non-limiting examples of such suitable materials include a strap or chain. The flush valve may be fabricated from any suitable material which is conventionally used in the art. Preferred are synthetic rubbers and thermoplastic polymeric materials, such as polyvinylchloride. As previously mentioned, the flapper type flush valve of this invention does not have adequate buoyancy to remain open during the flush cycle of a toilet. That is, it is substantially non-buoyant. This differs fundamentally from conventional flapper-type flush valves commonly used today, such as those described in U.S. Pat. No. 4,499,616, which is incorporated herein by reference. Such prior art flapper type flush valves have a buoyancy, which is usually provided by styrofoam components or air pockets. This allows the flush valve to remain in an open position upon activation of the lift arm and throughout discharge of substantially all of the water in the tank. The flush valve of this invention may be designed with or without a built-in buoyancy means. If the flush valve of this invention is designed with a built-in buoyancy means, said buoyancy means will be limited in size such that it would not counteract the hydrostatic pressure from the tank water upon the flush valve in its closed position. Another important distinction of the flush valve of this invention is that there is provided an eyelet member at or near the top surface of the flush valve. This eyelet member may be molded into the flush valve itself, or it may by secured to the top surface by any suitable means. The critical feature of the eyelet member is that it be of sufficient size, shape, and structure to allow for free and unobstructed passage of the flexible line without snagging. Non-limiting examples of materials which may be used include metal or plastic eyelets and fairleads. Preferred are fairleads. The eyelet member is preferably attached to the top surface of that part of the flush valve which is positioned over the discharge opening of the toilet tank when the flush valve is in its closed position. As used in the context of this invention, an eyelet member is a guide through which a flexible line may freely pass.

The buoyancy means of this invention serves to impart buoyancy to the flush valve upon activation of the toilet tank lift arm. The buoyancy is transferred from the buoyancy means to the flush valve via a flexible line which passes through the eyelet member attached to the flush valve. The flexible line serves to hold the buoyancy means at a selected height between the flush valve and the normal water level in the toilet tank. That selected height at which the buoyancy means is held determines the volume of water used and the volume of water saved per flush. Upon activation of the toilet tank lift arm, the flush valve opens and the water level in the toilet tank begins to drop. When the water level in the toilet tank drops below the level of the buoyancy means, the buoyancy means can no longer transfer its buoyancy to the flush valve via the flexible line. Thus, the flush valve closes after a volume of water equivalent to that between the height of the buoyancy means and the water line is discharged from the toilet tank, leaving in the tank a volume of water equivalent to that between the flush valve and the buoyancy means. Since in accordance with this invention the selected height of the buoyancy means in the toilet tank can be adjusted or changed from outside the toilet tank, the amount of water used per flush is controlled from outside the toilet tank.

Also, any suitable material can be used for the fabrication of the buoyancy means of the apparatus of the present invention, as long as it is substantially inert and will not deteriorate in water. Non-limiting examples of such materials include polymeric foams, certain woods, and other polymeric materials. It is preferred that the buoyancy means of this invention be selected from rigid, closed cell foams, such as polyurethane, and shapes of hollow construction. The buoyancy means must have an effective amount of buoyancy. That is, there are important limitations on the maximum and minimum buoyancy of the buoyancy means used in the practice of this invention. The maximum buoyancy of the buoyancy means should be less than the buoyancy which sufficiently counteracts the hydrostatic pressure upon the flush valve in its closed position to cause said valve to leak or to open. The minimum buoyancy of the buoyancy means should be sufficient to assure that the upward force exerted upon the flush valve through the flexible line is greater than the downward force of the non-buoyant flush valve. Thus, with the flush valve in its closed position and the toilet tank filled with water, the upward force exerted by the buoyancy means through the flexible line on the flush valve is not sufficient to overcome the effect of hydrostatic pressure on the flush valve, but with the flush valve in its open position during the draining cycle of the toilet (when hydrostatic pressure on the flush valve is neutralized) the upward force exerted upon the flush valve must be readily capable of overcoming the downward force of the non-buoyant flush valve.

The shape of the buoyancy means selected in the practice of this invention is not critical as long as it does not interfere with the intended operation of the apparatus of the present invention. Non-limiting examples of shapes which may be used for the buoyancy means of the present invention include spherical, cylindrical, cubic, ring or donut-shaped and other polygonal shapes. If the buoyancy means is ring or donut-shaped, the flexible line which is attached at one end to the buoyancy means and routed through the eyelet member, may then be allowed to pass freely through the center of the buoyancy means before being routed to the means for adjusting the vertical distance between the flush valve and the buoyancy means. The use of excessively elongated buoyancy means is undesirable. The flexible line is, at one of its two ends, connected to the buoyancy means; thereafter it passes freely through the eyelet member of the flush valve, terminating at the other end by attachment to a means for controlling the location of that end of said line. Since the length of the line is fixed, and since the buoyancy of the buoyancy means exerts an upward force on one end of the line, the means which controls the location of the other end of the line in fact controls the location of the entire line and therefor controls the vertical distance between the flush valve and the buoyancy means. It is an important distinguishing feature of this invention that the flexible line is not attached to the flush valve, but instead passes freely through the eyelet member which is attached to, or a part of, the flush valve. This feature contributes to the unique utility of the apparatus of this invention and its ability to vary the volume of water used in flushing conventional tank-type toilets by adjusting the vertical distance between the flush valve and the buoyancy means from outside the toilet tank.

The term "flexible line" as used in the context of this patent specification encompasses all suitable and utilitarian flexible elements, such as thread, string, strap, chain (beaded or link), cable and the like. The flexible line is preferably a monofilament line made of a high strength durable material, such as nylon. It is preferred that the flexible line have a diameter ranging between about 0.1 mm and 1.5 mm, and more preferably between 0.2 mm and 0.7 mm. The length of the line is selected such that the means discussed hereinbelow will serve to control the position of the buoyancy means between the flush valve and the water line in the toilet tank. It will be understood that the flush line connecting the flush valve to the lift arm is distinguished from the flexible line connecting the buoyancy means to the adjusting means which can be controlled from outside the tank in that the flexible line must be such that it can freely pass back and forth through the eyelet member during operation of the flush valve. A monofilament polymeric material, such as nylon is preferred.

Various means may be employed for adjusting the location of the end of the flexible line opposite that to which the buoyancy means is attached. For example, a magnet positioned on an iron metal strip attached to one of the outside walls of the toilet tank can serve as a means to which one end of the flexible line is firmly attached so that the vertical distance between the flush valve and the buoyancy means is controlled. Manually changing the position of the magnet on the metal strip changes the vertical distance between the flush valve and the buoyancy means, and thus changes the amount of water used per flush. The apparatus of this invention may be calibrated by placing reference markings on the iron metal strip, correlating the position of the magnet on the iron metal strip with water usage and facilitating a choice with respect to water usage depending on whether liquid or solid waste is to be flushed. Various other means for controlling the location of one of the ends of the flexible line in accordance with this invention will become apparent to those skilled in the art.

The toilet flush control apparatus and method of this invention is further described hereinbelow with reference to FIG. 1 illustrating one of the preferred embodiments of this invention. The apparatus consists of a flapper-type flush valve 1 equipped with a flush line 2 connecting said valve to lift arm 3. In its closed position, flapper valve 1 is seated in valve seat 4, thereby sealing the toilet tank discharge opening 5. In contrast to conventional flapper type flush valves which have sufficient buoyancy to remain open during the flush cycle, valve 1 of this invention does not have adequate buoyancy to remain open following the activation of lift arm 3. Instead, valve 1 is connected to buoyancy means 6 by means of flexible line 7 in such a way that the vertical distance of buoyancy means 6 from valve 1 can be controlled simply by adjusting the extent to which end A of line 7 is pulled downward. Buoyancy means 6 provides the buoyancy needed to keep valve 1 open following activation of lift arm 3. The vertical distance of buoyancy means 6 from valve 1 defines the volume of water used per flush, since only an amount of water equivalent to the volume between the water line 8 and the height of the buoyancy means 9 will drain upon activation of lift arm 3. The height of the water line s in toilet tank 10 is defined by a conventional water refill mechanism (not shown). Toilet tank 10 is also equipped with an overflow pipe 11. Once the water level in toilet tank 10 drops below [float] height 9 during flushing, buoyancy means 6 is no longer able to impart its buoyancy to valve 1 via line 7 and thus no longer serves to keep valve 1 open. Upon closure of valve 1, the flushing cycle is completed, with the balance of water left in toilet tank 10. As shown in FIG. 1, end A' of flexible line 7 is [firmly] attached to buoyancy means 6, and line 7 passes freely through eyelet member 12 attached to valve 1 and over the rim 13 of float toilet tank 10. End A of flexible line 7 is connected to a small magnet 14 positioned as shown in FIG. 1 on iron metal strip 15 attached to one of the side walls 16 of toilet tank 10. Moving of the magnet 14 to positions B, C, or D results in moving the buoyancy means to positions B', C', or D', respectively, with least water usage during toilet flushing corresponding to magnet position B and near complete water discharge from the toilet tank corresponding to magnet position D. Preferably, from eyelet member 12, flexible line 7a is routed through a second eyelet member 12a which is attached at the top of overflow pipe 11 before said flexible line is guided over the rim 13 toward magnet 14.

Figure 2:
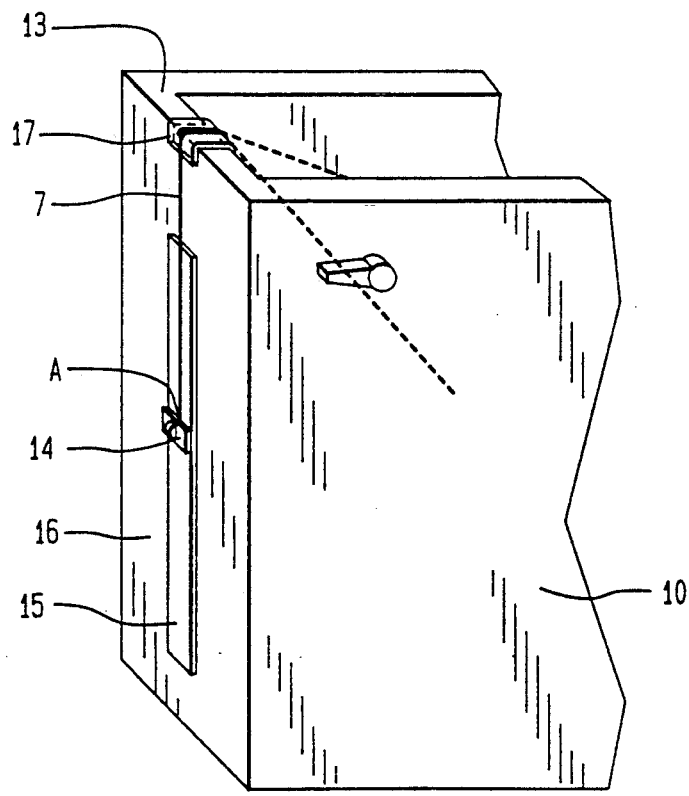
FIG. 2 is a partial perspective view of the front and left side of the toilet tank shown in FIG. 1.

FIG. 2 provides an isometric view of part of toilet tank 10, detailing the side wall 16 of the tank to which iron metal strip 15 is attached and showing small magnet 14 to which end A of flexible line 7 is attached. It is noted that an infinite number of positions are available for setting magnet 14 on iron metal strip 15, facilitating utmost flexibility in controlling the amount of water used per flush cycle of the toilet. FIG. 2 also shows a saddle 17 (not identified in FIG. 1) designed to protect line 7 from direct contact with rim 13 of toilet tank 10 and with its cover (not shown).

Preferably, the apparatus of this invention should be designed so as to minimize mechanical friction at the points where flexible line 7 contacts eyelet member 12 and rim 13. Thus, eyelet member 12 and saddle 17 should be designed to provide a smooth gently curved surface in areas where it contacts flexible line 7.

Figure 3:
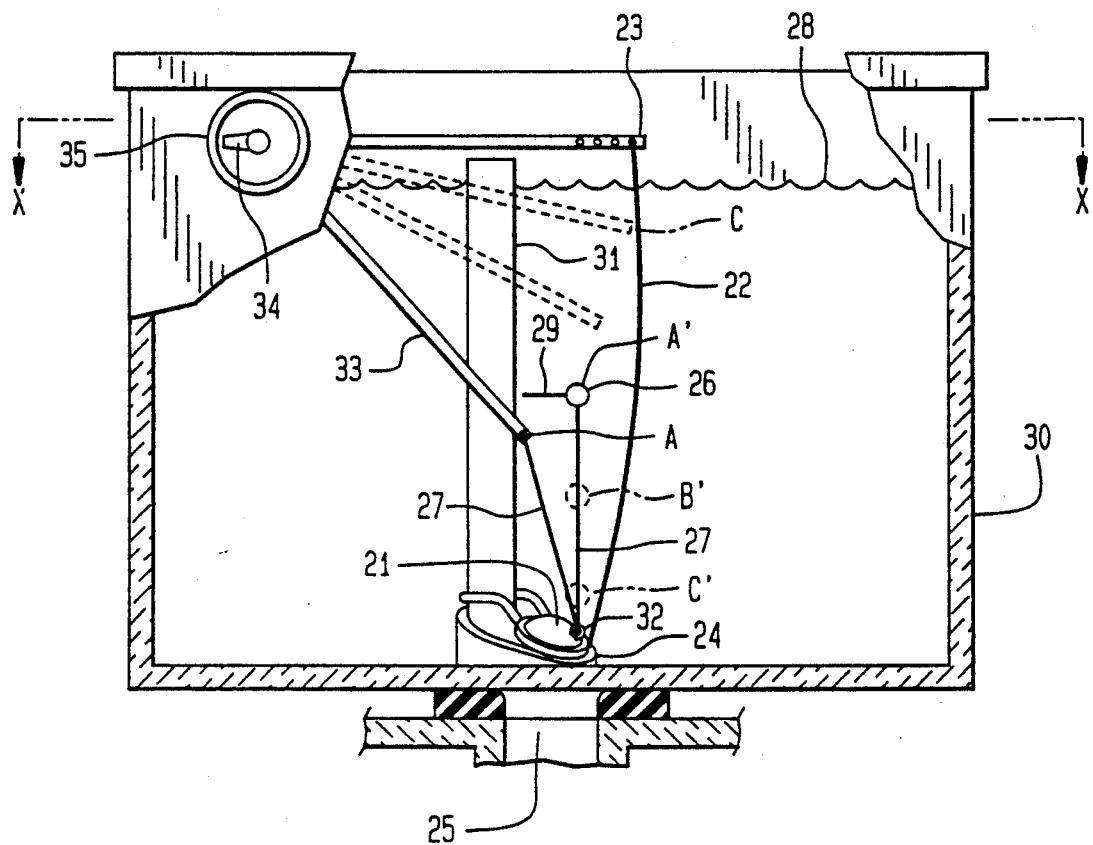
FIG. 3 is a front view, partly in elevation and partly in section, of a toilet tank equipped with an apparatus representing another preferred embodiment of this invention.

FIG. 3 illustrates another preferred embodiment of this invention. The apparatus consists of a flapper-type flush valve 21 equipped with a flush line 22 connecting said valve to lift arm 23. In its closed position, flapper valve 21 is seated in valve seat 24, thereby sealing the toilet tank discharge opening 25. In accordance with this invention, valve 21 does not have adequate buoyancy to remain open following the activation of lift arm 23. Instead, valve 21 is connected to buoyancy means 26 by means of flexible line 27 in such a way that the vertical distance of buoyancy means 26 from valve 21 can be controlled simply by adjusting the extent to which end A of line 27 is pulled upward. Buoyancy means 26 provides the buoyancy needed to keep valve 21 open following raising and releasing of lift arm 23. The vertical distance of buoyancy means 26 from valve 21 defines the volume of water saved per flush, since only an amount of water equivalent to the volume between the water line 28 and buoyancy means height 29 will drain upon raising and releasing of lift arm 23. The height of the water line 28 in toilet tank 30 is defined by a conventional water refill mechanism (not shown). Toilet tank 30 is also equipped with an overflow pipe 31. Once the water level in toilet tank 30 drops below buoyancy means height 29 during flushing, buoyancy means 26 is no longer able to impart its buoyancy to valve 21 via line 27 and thus no longer serves to keep valve 21 open. Upon closure of valve 21, the flushing cycle is completed, with the balance of water left in toilet tank 30. As shown in FIG. 3, end A' of flexible line 27 is [firmly] attached to buoyancy means 26, and line 27 passes freely through eyelet member 32 attached to valve 21. End A Of flexible line 27 is connected to the end of flush control arm 33. While lift arm 23 is activated by flush handle 34, the position of flush control arm 33 can be changed by turning flush control dial 35. Thus, by turning flush control dial 35 counter-clockwise, flush control arm 33 can be lifted to positions B or C, with buoyancy means 26 moving to positions B' or C', respectively. In accordance with this invention, only about half of the water contained in toilet tank 30 would be used with buoyancy means 26 and flush control arm 33 in the position shown in FIG. 3. Lifting flush control arm 33 to position B results in a larger volume of water used per flush, and lifting flush control arm 33 to position C results in near complete water discharge from the toilet tank. While positions A, B, and C are shown in FIG. 3 by way of example, it will be apparent to those skilled in the art that the positions of the flush control arm 33 and the corresponding positions of buoyancy means 26 are infinitely variable.

Figure 4:
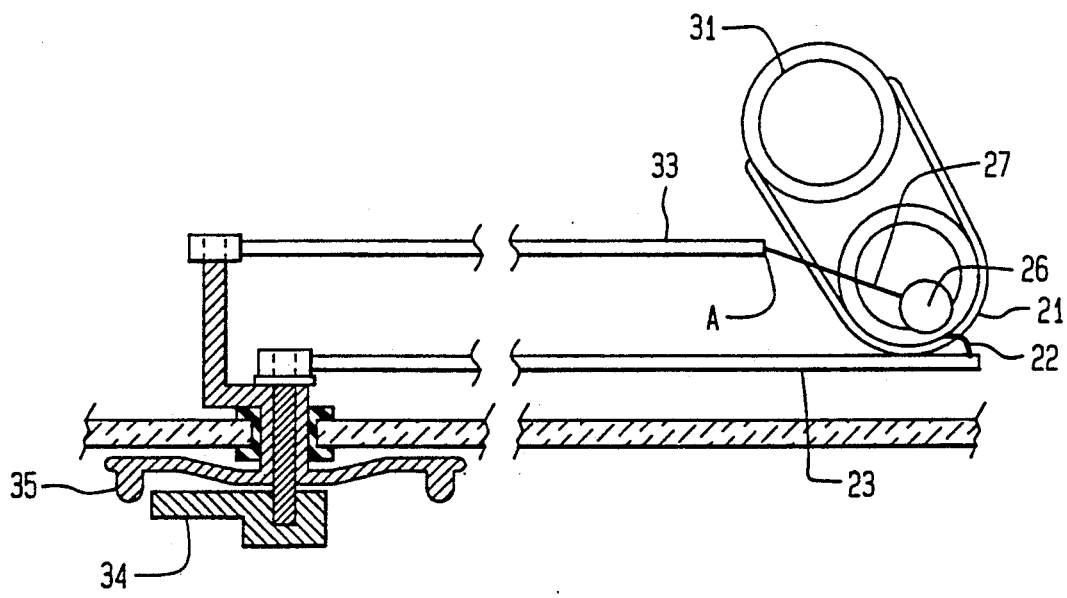
FIG. 4 is an enlarged partial cross sectional view taken along line x—x of FIG. 3.

FIG. 4 is an enlarged partial cross sectional view taken along line x—x of FIG. 3. It illustrates flapper-type flush valve 21 connected with flush line 22 to lift arm 23 activated by flush handle 34. The flush valve 21 is also shown pivotally attached to overflow pipe 31. Also shown is buoyancy means 26 and part of flexible line 27, end A of which is connected to the end of flush control arm 33. The position of control arm 33 can be set from outside the toilet tank via flush control dial 35.

While FIGS. 1 through 4 illustrate two embodiments of this invention employing two different means of controlling the height of the buoyancy means, and thus the volume of water used per flush, many other means of controlling the range through which flexible line 7 is traversed will become apparent to those skilled in the art.

The apparatus of this invention offers several distinct advantages over prior art. The most apparent advantages of the apparatus of this invention include its simplicity of design, ease of installation, and reliability of operation. Also, the apparatus of this invention provides for remarkable flexibility in controlling, from outside the toilet tank, the amount of water discharged in each flush cycle from toilet tanks equipped with said apparatus. Furthermore, the apparatus of this invention offers versatility of application, as it is equally suitable for installation in existing toilet tanks and for utilization in new toilet tanks. The most important advantage of the apparatus of this invention lies in its unique potential in conserving water resources.

The essence of the invention lies in the combined usage of a flush valve which by itself does not have adequate buoyancy to remain open during the flush cycle and of a separate buoyancy means which imparts the needed buoyancy to the valve via a flexible line, wherein the vertical distance between the valve and the buoyancy means can be controlled from outside the toilet tank. Various modifications of the invention may become apparent to those skilled in the art, but are nevertheless deemed to fall within the scope and spirit of this invention.

EXAMPLE 1

A conventional toilet tank was used in this example. An iron metal strip, 3.0 cm wide, 30.0 cm high and 0.5 mm thick was attached, using two sided adhesive tape, to the left side of the toilet tank, as shown in FIG. 2. The internal dimensions of the toilet tank were as follows: 47.0 cm frontal width, 16.7 cm side width, 32.0 cm height. The normal water line, controlled by a conventional toilet fill valve, was 22.0 cm from the bottom of the tank, and the amount of water used with each flush of the toilet was about 16 liters (about 4.2 gallons). The conventional flapper type flush valve was removed from the toilet tank and replaced with a flapper type flush valve of this invention. The flush valve employed in this example was of similar construction as the flush valve described in U.S. Pat. No. 4,499,616, with two important exceptions: (1) the built-in float of the flush valve used in this example was sufficiently smaller in size than the built-in floats in flush valves of prior art to assure that the flush valve used in this example was substantially non-buoyant, and (2) the flush valve used in this example was equipped with a fairlead, as shown in FIG. 1. The flush valve strap was connected in the usual manner to the lift arm. The free end of a monofilament line, with a 3.3 cm diameter spherical float, or buoyancy means attached to its other end, was fed through the fairlead, passed over the left edge of the toilet tank and attached to a small magnet positioned on the iron metal strip. The monofilament line was 66.0 cm long and 0.5 mm in diameter. The apparatus of this invention was now installed, essentially as shown in FIGS. 1 and 2. The time required to remove the conventional flush valve and install the apparatus of this invention was less than 5 minutes. The toilet tank, which was equipped with a conventional water refill mechanism, was allowed to refill to the normal water level. The magnet was set on the iron metal strip in a position selected so that the spherical buoyancy means was positioned just above the flush valve, i.e. the distance between the fairlead and the bottom of the buoyancy means was less than 1 cm. Upon depressing and releasing the flush handle which resulted in raising and releasing the lift arm, the flush valve opened and remained open until about 16 liters of water had drained from the toilet tank. The toilet tank was allowed to refill with water and the magnet was moved about 5 cm upward on the iron metal strip, allowing the buoyancy means to rise to a height of about 5.5 cm above the flush valve. The flush handle was again depressed and released, the flush valve again opened, however during this cycle the flush valve remained open only long enough to permit about 12 liters of water to be drained from the toilet tank, whereupon it resealed the toilet tank drain. As a result, about 4 liters or about 25% of water was saved in this flush cycle. The toilet tank was again allowed to refill with water and the magnet was moved about 5.5 cm upward on the iron metal strip, thus allowing the buoyancy means to rise to a height of about 11 cm above the flush valve. The flush handle was again depressed and released, the flush valve again opened, however this time the flush valve remained open only until about 12 liters of water had drained from the toilet tank and then resealed the toilet tank drain. The water savings for this cycle amounted to about 8 liters or about 50% of the water used with this toilet tank when its draining cycle is unrestrained.

This example serves not only to illustrate the apparatus of this invention, but also a method of installing the apparatus of this invention and a method of its use.

Various changes and/or modifications, such as will present themselves to those familiar with the art may be made in the apparatus of the present invention without departing from the spirit of the present invention, whose scope is commensurate with the following claims.

What is claimed is:

1. An apparatus for variably controlling the volume of discharge water from a toilet of the type having a tank with an overflow pipe with a top portion and a flush port therein, a valve seat surrounding said port and capable of accommodating a flapper-type flush valve for opening and closing said flush port, a lift arm for activating said flush valve, and a flush line connecting said lift arm to said flush valve, the apparatus comprising of:
   (a) a non-buoyant flush valve having top and bottom sides and having an eyelet member for the free passage of a flexible line;
   (b) a buoyancy means for providing adequate buoyancy to said flush valve so that it remains open during discharge of a predetermined volume of water from the tank, but not so much buoyancy that it will counteract the hydrostatic pressure upon the flush valve in its closed position;
   (c) a flexible line which freely passes through said eyelet member and is secured at one end to said buoyancy means, and at its other end is secured to a means for adjusting the distance between the flush valve and said buoyancy means; and
   (d) a means for adjusting the distance between the flush valve and said buoyancy means, wherein said adjusting means is located outside of said tank.

2. The apparatus of claim 1 wherein the eyelet is a fairlead.

3. The apparatus of claim 1, wherein said eyelet member is attached to said top side of said flush valve which is positioned over the discharge opening of the toilet tank when said flush valve is in its closed position.

4. The apparatus of claim 1, wherein said buoyancy means is fabricated of polyurethane.

5. The apparatus of claim 1 wherein said flexible line securing the buoyancy means to the means for adjusting the distance between the buoyancy means and the flush valve is composed of a monofilament polymeric material.

6. The apparatus of claim 5, wherein said monofilament line has a diameter between about 0.1 mm and about 1.5 mm.

7. The apparatus of claim 5, wherein said monofilament line has a diameter between about 0.2 mm and about 0.7 mm.

8. The apparatus of claim 1, wherein said means for adjusting the distance between the buoyancy means and the flush valve comprises a magnet positioned on an iron metal strip attached to an outside wall of said toilet tank and wherein the other end of said flexible line is attached to said magnet.

9. The apparatus of claim 1, wherein said means for adjusting the distance between the buoyancy means and the flush valve comprises a flush control arm to which the other end of said flexible line is attached and the position of which can be controlled from outside the toilet tank.

10. The apparatus of claim 1 wherein the flexible line is attached at one end to the means for adjusting the distance between the buoyancy means and the flush valve, then passes through an eyelet member at the top portion of the overflow pipe, then passes through said eyelet member of the flush valve, and is then attached at the other end to the buoyancy means.

11. A method for converting a toilet of the type having a tank with a flush port therein, a valve seat surrounding said port, a flapper-type flush valve seated on said valve seat for opening and closing said flush port, a lift arm for activating said flush valve, and a flush line connecting said lift arm to said flush valve, which method comprises:

(a) removing the existing flapper-type flush valve from the toilet tank;
(b) replacing said existing flapper-type flush valve with a flapper-type flush valve which is equipped with an eyelet member and which does not have adequate buoyancy to remain open during the discharge cycle of said toilet tank;
(c) installing a buoyancy means which is capable of providing adequate buoyancy to keep said flush valve open during the discharge cycle of said toilet tank, said buoyancy means being attached to one end of a flexible line;
(d) passing said flexible line from the buoyancy means through said eyelet member;
(e) installing a means for controlling the vertical distance between said installed flush valve and said buoyancy means from outside said toilet tank; and
(f) attaching the other end of said flexible line to said means for adjusting the vertical distance between the installed flush valve and said buoyancy means.

* * * * *